June 6, 1961
J. T. MYERS
2,987,134
COMBINED TRUCK DRIVE AND POWER TAKE-OFF
Filed March 4, 1958
2 Sheets-Sheet 1
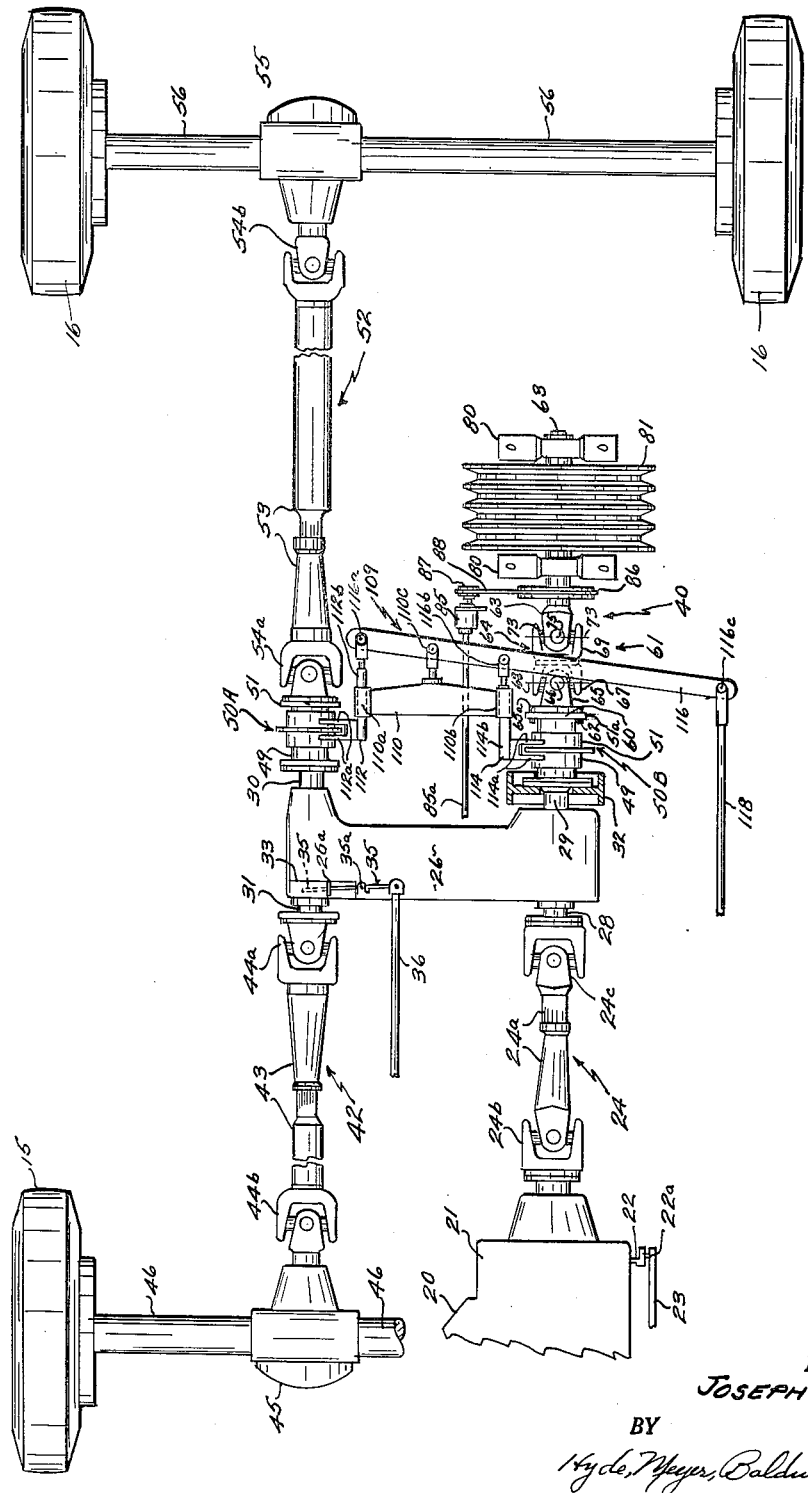
INVENTOR.
JOSEPH T. MYERS
BY
Hyde, Meyers, Baldwin & Doan
ATTORNEYS

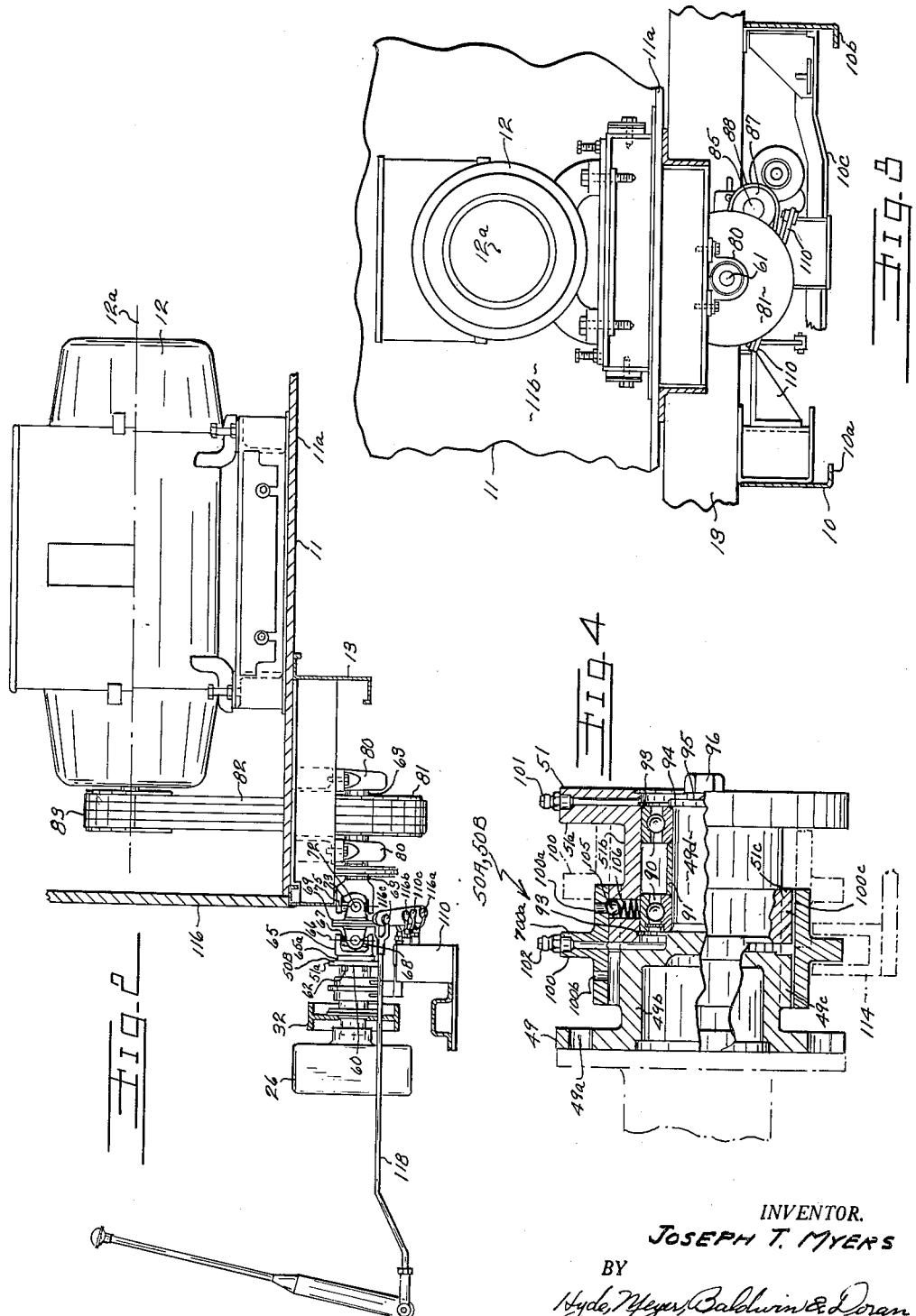

2,987,134
COMBINED TRUCK DRIVE AND POWER TAKE-OFF

Joseph T. Myers, Kent, Ohio, assignor to Davey Compressor Company, Kent, Ohio, a corporation of Ohio
Filed Mar. 4, 1958, Ser. No. 719,152
4 Claims. (Cl. 180—53)

This invention relates to improvements in a vehicle and/or power transmission and more particularly to one having a power take-off.

An object of the present invention is to provide a vehicle and/or power transmission being propelled by only one normally driving rolling support means, being propelled by a plurality of rolling support means at the driver's option, being propelled solely by another rolling support means separate from the aforerecited normally driving rolling support means, having a power driven load unit driven through a power take-off unit means, having drive control means for controlling drive disengaged and engaged positions in a drive to one rolling support means and in a drive to the power take-off unit means for maintaining the drives in opposite position relationship so that one means is idle while the other means is being driven, having one rolling support means adapted to be driven or idle while the power take-off units means drives the load, mounting the load unit parallel with the direction of travel of the vehicle and/or permitting the load unit, and its supporting sub-frame, to be removed with the driven portion of the power take-off unit means so that (1) the normal drive to the vehicle by its rolling support means is not effected, and (2) the load unit may be driven from an external power source through the driven portion of the power take-off unit means.

A further object of the present invention is to provide a vehicle and/or drive mechanism characterized by design characteristics permitting easy substitution for conventional components, structural simplicity, economy of manufacture, strong and sturdy nature, ease of operation, operating efficiency, and/or many different functional modes of operation and advantages.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a bottom plan view of a vehicle with portion thereof omitted;

FIG. 2 is a vertical sectional fragmentary view including a portion of the structure in FIG. 1, a portion of the supporting frame work and a load unit driven by the vehicle engine in FIG. 1;

FIG. 3 is a rear view of the load unit in FIG. 2, taken looking toward the left at the right hand end of FIG. 2, and of a portion of the vehicle associated therewith; while FIG. 4 is a longitudinal sectional view enlarged of one of the two identical clutches in FIG. 1.

Before the mechanism here illustrated is specifically described, it is to be understood that the invention here involved is not limited to the structural details or arrangement of parts here shown since mechanisms embodying the present invention may take various forms. It is also to be understood that the phraseology or the terminology herein employed are for purposes of description and not of limitation since the scope of the present invention is denoted by the appended claims.

Although the present invention might be applied in many ways, it has been chosen to show the same as applied to a vehicle, such as the truck specifically illustrated herein, adapted to be propelled in a forward or reverse direction and having a power take-off driving a load unit carried by the truck body.

The illustrated truck includes a main frame 10 with a portion thereof shown in FIG. 3 including parallel side members 10a and 10b and a connecting cross member 10c having its left portion broken away in FIG. 3. This frame 10 has detachably secured thereto a sub-frame 11, taking the form in the present disclosure of a truck body including a floor 11a and a front wall 11b secured together in any suitable manner and within which a motor driven load unit 12 is housed. One or more cross members 13 are detachably secured to either frame 10 or sub-frame 11 at the top or bottom end in any suitable manner, such as by nut and bolt connections (not shown), to provide a detachable connection.

The sub-frame or truck body 11 may take any suitable form but is preferably a truck body for a general utility vehicle, such as a portable machine shop, an Army maintenance or ordnance truck, a blast hole digger for explosives, an electric generator, or a welder generator, such as shown by load unit 12 in FIGS. 2 and 3.

Any suitable front and rear rolling support means can be secured to the frame for supporting and propelling the vehicle and its frame in the forward or reverse direction. This rolling support means is shown as a front pair of wheels 15 (only one wheel being shown in FIG. 1) and a rear pair of wheels 16 with each wheel including a tire and with each pair being connected by a conventional axle housing 46 or 56 to frame 10 in any suitable manner, such as by conventional leaf springs to the respective frame side members 10a and 10b. Also, at least the front pair of wheels 15 would usually be mounted to the frame for steering movement in the conventional manner, but such details are omitted here.

The vehicle includes a motor 20 mounted on frame 10 in any suitable manner to be carried thereby. This motor 20 drives a conventional gear shift, speed change, forward and reverse transmission 21 wherein the speed changes are made by a shifter lever 22 being oscillated to the different speed positions by a link 23, connected to lever 22 by pivot 22a, operatively controlled within a cab (not shown) carried by frame 10 within which the driver of the vehicle is located.

A conventional power divider or transfer case 26 is secured to frame 10 by cross member 10c in FIG. 3 with member 10c being in turn secured at opposite ends to frame side members 10a and 10b. This power divider 26 is driven by motor 20 through main drive shaft 24 in FIG. 1 having two universal joints 24b and 24c and having two sections 24a telescopically associated together by a splined connection for axial relative movement but with these two sections locked together against relative rotational movement so that both rotate together about their logitudinal axis. Universal joint 24b is driven by transmission 21 and universal joint 24c is secured to driving shaft 28 of power divider 26, which shaft 28 is either directly connected to, or connected by suitable gearing, as found in a conventional power divider or transfer case with driven or output shafts 29, 30 and 31 for respectively driving power take-off 40, rear wheels 16, and front wheels 15. A conventional truck brake may be secured to one of these shafts with it shown herein as including truck brake drum 32 secured to driven shaft 29.

In the conventional power divider 26, power is supplied from driving shaft 28 to driven shaft 30, and then from shaft 30 through a clutch 33 to driven shaft 31. This clutch 33 includes a lever 35 extending through slot 26a in the housing of power divider 26 for operation of the clutch 33 within this housing, a pivot 35a between lever 35 and the housing of power divider 26 for pivotal movement of lever 35, and a link 36 pivotally connected to lever 35 and operatively controlled by the vehicle operator in the cab mentioned heretofore but not shown.

The truck may be propelled by motor 20 driving front wheels 15 through power divider 26 to provide a driving means drivingly connecting power divider 26 and front wheels 15. This drive includes a driving connection from driven shaft 30 to front wheels 15 through clutch 33, driven shaft 31, front wheel propeller or drive shaft 42 including universal joints 44a and 44b and splined connected telescopic sections 43 having a construction similar to and operating in the same manner as main drive shaft sections 24a, front differential 45, the front axle in front axle housing 46, and the pair of front wheels 15 (only one of which being shown).

Motor 20 may also propel the vehicle by rear wheels 16 through a drive from motor 20 through power divider 26 to rear wheels 16 to provide a driving means drivingly connecting rear wheels 16 to the power divider 26. This drive from driven shaft 30 to rear wheels 16 is from driven shaft 30 through driving member 49 and driven member 51 of clutch 50A, a rear wheel propeller or drive shaft 52 including universal joints 54a and 54b and splined connected sections 53 having a construction similar to and operating in the same manner as main drive shaft splined sections 24a, rear differential 55, the rear axle in rear axle housing 56, and rear wheels 16.

Motor 20 may drive load unit 12 on sub-frame 11 through power divider 26 and power take-off 40 with suitable driving means drivingly connecting the power take-off 40 and power divider 26. Power take-off 40 includes a driving portion 60 comprising flange 51a of driven member 51 of clutch 50B, a driven portion 61 comprising universal joint 64 secured to shaft 63, and disconnectable coupling bolts 62 detachably securing portions 60 and 61 together. The drive from power divider 26 to load 12 is from driven shaft 29 through clutch 50B having driving member 49 secured to driven shaft 29 and driven member 51 having a flange 51a or driving portion 60, coupling bolts 62, and driven portion 61.

The universal joint 64 includes a pivot member 67 secured to the straddling arms of universal joint member 65 for pivotal movement about axis 66, a drive transmission member 69 having arms straddling pivot member 67 and secured thereto by suitable pivot means for pivotal movement about axis 68, said drive transmission member 69 also having another pair of arms straddling a pivot member 73 and pivotally secured thereto for movement about axis 72 in any suitable manner, and pivot means securing pivot member 73 between the straddling arms of driven shaft 63 for pivotal movement about axis 75.

The bolts 62 are spaced about the axis of rotation, extend through drilled holes in flange 51a of member 51, and are screwed into aligned threaded holes in flange 65a of universal joint member 65. Hence, when bolts 62 are detached, portions 60 and 65a are disconnected.

Power take-off 40 has shaft 63 of driven portion 61 rotatively mounted in bearing brackets 80, 80 secured to floor 11a of sub-frame 11 so as to be supported thereby.

V-driving sheave 81 is keyed to the shaft 63. Power take-off unit 40 drives load unit 12 by V-belts 82 from driving sheave 81 to driven sheave 83 on longitudinal rotational axis 12a of load unit 12.

The truck may be equipped with an equipment speed governor 85 operable only while the load unit 12 is being driven. This speed governor 85 is secured to the subframe 11 in any suitable manner and has a shaft or flexible cable 85a leading to a suitable motor control for controlling the speed of motor 20. Governor 85 is driven by a sheave 86 on driven shaft 63 through a drive belt 88 to a driven sheave 87 on the equipment governor 85.

Each clutch 50A and 50B is identical in construction, and this construction is illustrated in FIG. 4 partially in section. This clutch includes driving member 49 having a flange 49a adapted to be secured by circumferentially spaced bolts, or in any other manner, to the flange on driven shaft 29 or 30 and includes driven member 51 having a flange 51a adapted to be similarly secured to universal joint flange 65a of universal joint 64. Clutch driving member 49 includes in FIG. 4 a cylindrical body 49b, and external spline 49c and a cylindrical pilot shaft 49d integrally secured together with flange 49a. Axially spaced apart bearings 90, 90 are maintained in this relationship on pilot shaft 49d by a spacer sleeve 91 with the inner race of these bearings 90 locked in position against end thrust by an assembly washer 94, a lock washer 95 and a nut 96 screwed on to a threaded projection of pilot shaft 49d. The driven member 51 includes a cylindrical sleeve body 51b and an external spline 51c integrally connected to flange 51a. Snap rings 93, 93 lock the outer races of bearings 90, 90 in the bore of the sleeve body 51b. A clutch sleeve 100 is telescopically associated for axial movement between the solid line and dot-dash line positions over the member body portions 49b and 51b with its integral internal spline 100c coacting with external splines 49c and 51c so that member 49 will rotatively drive therewith member 51 in the solid line or engaged position of clutch sleeve 100 but will not transmit the drive from member 49 to member 51 when in the dot-dash line or disengaged position of FIG. 4 with the left end of internal spline 100c located axially to the right of external spline 49c. Suitable grease fittings 101 and 102 are secured to flange 51a and flange 700a of clutch sleeve 100 for supplying lubrication grease to bearings 90.

This clutch may be shifted between engaged and disengaged positions and locked in either position. Clutch sleeve 100 is shown in the engaged position in solid lines in FIG. 4 with ball 105 biased by spring 106 and carried by a hole in member 51b so that the ball 105 is pressed outwardly into detachable locking engagement with hole 100a in clutch sleeve 100. However, the clutch may be shifted to disengaged or dot-dash line position in FIG. 4 by moving its flange 100a axially toward the right until ball 105 is pressed outwardly into engagement with hole 100b of clutch sleeve 100 to lock the clutch in this position.

Drive control means is provided, including clutches 50A and 50B and suitable clutch control means for these clutches, for controlling the drive to rear wheels 16 and power take-off 40. This clutch control means 109 is adapted to move clutches 50A and 50B simultaneously between disengaged and engaged positions and is adapted to maintain these clutches in opposite position relation so that one of the clutches will be engaged while the other clutch is disengaged so that the motor will alternately drive power take-off 40 and rear wheels 16 with the load unit 12 being driven by the power take-off only when the rear wheels 16 are idle; and with the rear wheels 16 being driven only when the load unit 12 is idle. Clutch control means 109 includes a clutch control shifter bracket 110 in FIGS. 1, 2 and 3 secured to frame 10, having slide sleeves 110a and 110b having bores with parallel axes; and having a fixed pivot 110C. Clutches 50A and 50B are moved between engaged and disengaged positions by a link 118 manually controlled at its left end from the truck cab to move shifter lever 116, to which it is pivotally connected by pivot 116c, about fixed pivot 110c on bracket 110 to move a rear wheel drive clutch shifter 112 and a power take-off clutch shifter 114 in opposite directions to thus control clutches 50A and 50B respectively. The shifters 112 and 114 include respectively straddling finger pairs 112a and 114a straddling flange 100a of clutch control sleeves 100 of clutches 50A and 50B and include control rods 112b and 114b slidably mounted in sleeves 110a and 110b and pivotally connected by pivots 116a and 116b to lever 116 respectively. Hence both clutches 50A and 50B will be shifted simultaneously by this clutch control means 109 with one of the clutches being shifted to the engaged position and the other to the disengaged position, as illustrated by example with clutch 50B in FIG. 1 and clutch control sleeve 100 in the solid line position of FIG. 4 being in the engaged position and with clutch 50A in FIG. 1 and control sleeve 100 in the dot-dash line position of FIG. 4 being in the disengaged position.

The mode of operation and the operational advantages of the heretofore described structure should be readily apparent.

First, the truck or vehicle can be driven at high speed upon a highway by only the normally driving rear wheels 16 being driven by motor 20 through engaged clutch 50A.

Second, if four wheel drive is required to pull the truck out of mud, to travel over rough terrain, or for any other reason, clutch 33 may be engaged by its control link 36 so that four wheel drive is obtained. However, disengagement of clutch 33 will disengage the front wheels so that only the rear wheels 16 drive upon a highway because normal driving of only the rear wheels 16 is to be preferred over a four wheel drive of all wheels 15 and 16 on this type truck wherein driven shaft 30 and 31 rotate at the same speed when all four wheels are being driven because all four wheels will travel at approximately the same speed when going in a straight direction so that any differences in the diameters of the wheels, caused by wear or any differences in inflation, will cause some wheels, and the tires thereon, to have a skidding action on the highway to produce rapid wear. Also, this type four wheel drive may cause tire wear problems as the truck is steered around a corner.

Third, the truck may be driven by the front wheels 15 providing the sole propelling action, when clutch 50A is disengaged and clutch 33 is engaged. This could be of major importance under conditions of full slip of the rear wheels.

Fourth, clutch control means 109 permits the power take-off 40 and rear wheels 16 to be alternately driven by motor 20 with one being idle while the other is driven so that one clutch, clutch 50A or clutch 50B, is engaged while the other is disengaged. This shifting action shifts both clutches 50A and 50B simultaneously by a single movement of control link 118. This mode of operation ties in with the intended operation of the truck as a portable machine shop for an army maintenance unit wherein the load unit 12, shown herein as a welder generator, is used only while the truck is idle and not traveling over the highway so that power unit 40 is being driven by the motor 20 through engaged clutch 50B while clutches 33 and 50A are disengaged so that the wheels do not propel the truck. However, when the truck is traveling across the highway propelled by the rear wheels 16 driven by motor 20, clutch 50A is engaged and 50B is disengaged with the load unit 12 not in operation because it is normally not required at this time.

Fifth, having the drive of front wheels 15 by motor 20 independent of the drive of rear wheels 16 and power take-off 40 offers another advantage in addition to the second and third advantages mentioned heretofore. Front wheels 15 can be driven simultaneously with or separately from power take-off 40 or rear wheels 16 with front wheels 15 being driven while either rear wheels 16 or power take-off 40 are idle or with the front wheels being idle while either power take-off 40 or rear wheels 16 are driven. Of course, if the front wheels 15 are driven, as in the above illustration, either the rear wheels 16 or the power take-off 40 may be driven simultaneously therewith at the user's option. The advantage of driving both the front and rear wheels 15 and 16, while the power take-off 40 is idle, has been also discussed in the second aforementioned advantage. However, there is an advantage in driving the front wheels and the power take-off 40 with rear wheels 16 idle with clutch 50A disengaged and clutches 33 and 50B engaged. This permits the front wheels 15 to propel the truck in the forward or reverse direction while the load unit 12 is being driven by the motor 20. Then, if load unit 12 is a drilling unit for drilling blast holes for explosives, engagement of clutch 33 will permit forward travel of the truck from hole to hole while disengagement of clutch 33 will permit the load unit 12 to drill the blast holes. Hence, clutch 50B will remain engaged at all times and the truck will have only a two wheel drive since rear wheels 16 are not in driving relationship.

Sixth, a conventional truck may be easily modified to include the present invention with full torque and full horsepower being transmitted by each component of the drive. Power divider or transfer case 26 is of the conventional design, but if the truck has a case of different design, this case 26 may be easily substituted therefore without a change in the original drive shaft angularity, since drive shaft splined sections 24a, 43 and 53 easily compensate for minor dimensional variations. This case 26 will transmit full torque and full horsepower to all its driven shafts 29, 30 and 31. A transfer case substitution may be made without regard to wheel base, cab to axle, or transmission 21 to axle dimensions for its successful operation. Driven portion 61 of power take-off 40 is easily installed on the bottom of any truck body or sub-frame 11 and is easily connected to the full torque output shaft 29 of power divider 26 for transmitting full torque and full horsepower with this installation being independent for its operation of wheel base, cab to axle, or transmission to axle dimension.

Seventh, the disclosed structure permits the load unit 12 to be mounted parallel with the main frame 10 with the load driving member or sheave 83 of power take-off 40 mounted for rotation about an axis 12a extending in the direction of vehicle travel. Then, load unit 12 may have its long dimension extending in the direction of travel so that a load unit of maximum size may be installed in the truck body or sub-frame 11 while permitting minimum vehicle width. This load unit 12, such as a compressor, a generator, pump, etc., of long length may be mounted on the truck in this manner under all conditions of wheel base, cab to axle, and transmission to axle dimensions.

Eighth, sub-frame or truck body 11 may be removed from truck frame 10 without affecting the drive through transfer case 26 to the drive wheels 15 and 16, and load unit 12 may be driven from an external power source, such as another motor, through a portion of the power take-off 40, if so desired. This may be accomplished by removing sub-frame 11, detachably connected to frame 10, and disconnecting power take-off driving and driven portions 60 and 61 by removing coupling bolts 62. Then, driving portion 60 remains as part of control clutch 50B secured to vehicle frame 10, while the driven portion 61 with universal joint 64, the driving sheave 81, and load unit 12 are removed with sub-frame or body 11. As to the remaining vehicle, front and rear wheels 15 and 16 now may be driven in their normal manner with clutches 33 and 50A each having their normal mode of operation. However, load unit 12 may be connected up to a motor on another truck or may be connected up to a stationary motor, similar to motor 20, with this new motor adapted to drive the driven portion 61 in any suitable manner, Then, universal joint 64 will be in the new drive to load unit 12 to correct for any misalignment between the new motor and the driven portion 61 on the vehicle body 11.

Various changes in details and arrangement of parts can be made by one skilled in the art without departing from either the spirit of this invention or the scope of the appended claims.

What is claimed is:

1. A vehicle, including a frame having detachably secured thereto a sub-frame, a load unit on said sub-frame, a motor on said frame, a front pair of wheels and a rear pair of wheels on said frame for supporting and propelling said frame along a direction of travel with the rear wheels being the normal driving wheels, a power take-off on said frame driving said load unit on said sub-frame, a power divider on said frame driven by said motor, a first driving means drivingly connecting said rear wheels to said power divider for propelling said vehicle by said motor driving said rear wheels through said power divider, a second driving means drivingly connecting said power take-off to said power divider for driving said power take-off by said motor through said power divider, said first driving means including a clutch in the driving connection between said rear wheels and said power divider, said second driving means including a clutch in the driving connection between said power take-off and power divider, drive clutch control means for moving the clutch of each of said driving means between disengaged and engaged positions, means for maintaining the clutches of said driving means in opposite position relation so that the clutch of one of said driving means is engaged while the clutch of the other of said driving means is disengaged so that said motor may alternatively drive said power take-off and said rear wheels so that said load unit is driven only when said rear wheels are idle and so that said rear wheels are driven only when said load unit is idle, said power take-off including a driving portion and driven portion joined by a disconnectable coupling, said driving portion being driven by said power divider and supported by said frame, said driven portion being connected in driving relationship to said load unit and being supported by said sub-frame so that said driven portion and load unit may be detached with said sub-frame from said frame at said coupling with the driven portion on said sub-frame connectable in driving relationships to another driving engine, said driven portion member having a load driving member mounted for rotation about an axis extending in the direction of travel for driving the load unit on said sub-frame with its long dimension extending in the direction of travel, and a third driving means drivingly connecting said power divider and said front wheels for propelling said vehicle by said motor driving said front wheels through said power divider while either said rear wheels or said load unit is being driven by said motor so that said motor drives the front wheels independently of said power take-off and said rear wheels so that both the power take-off and said front wheels can be driven simultaneously or can be driven separately with one being driven while the other is idle and so that both the front and rear wheels can be driven simultaneously or can be driven separately with one pair driving while the other pair is idle.

2. A vehicle, including a frame, a motor on said frame, rolling support means on said frame for supporting and propelling said frame along a direction of travel, a power take-off on said frame adapted to drive a load unit on said frame, a power divider on said frame driven by said motor, a first clutch drivingly connecting at least some of said rolling support means to said power divider for propelling said vehicle by said motor driving said some rolling support means through said power divider, a second clutch drivingly connecting said power take-off to said power divider for driving said power take-off by said motor through said power divider, each of said clutches being movable in one direction between clutch disengaged and engaged positions and in an opposite direction between clutch engaged and disengaged position, and a manually movable lever movably mounted on said frame for movement in opposite directions between first and second positions and connected to said clutches for simultaneously moving said clutches in opposite directions so that one of said clutches is automatically engaged while the other of said clutches is automatically disengaged in said first position and so that said one clutch is automatically disengaged while said other clutch is automatically engaged in said second position, each clutch having a clutch axis along which axis movement between said positions occurs, said clutch axes being in parallel arrangement, said lever having spaced apart pivots with one pivot connected to each clutch and having a pivotal connection to said frame located between said pivots.

3. A vehicle, including a frame, a motor on said frame, rolling support means on said frame for supporting and propelling said frame along a direction of travel, a power take-off on said frame adapted to drive a load unit on said frame, a power divider on said frame driven by said motor, a first driving means drivingly connecting at least some of said rolling support means to said power divider for propelling said vehicle by said motor driving said some rolling support means through said power divider, a second driving means drivingly connecting said power take-off to said power divider for driving said power take-off by said motor through said power divider, said power take-off including a driving portion driven by said power divider and driven portion joined by a disconnectable coupling, said driving portion being driven by said power divider and supported by said frame, a sub-frame detachably secured to said frame, said load unit being secured to said sub-frame, said driven portion being connected in driving relationship to said load unit and being rotatably secured to said sub-frame so that said driven portion of said power take-off and load unit may be detached with said sub-frame from said frame at said coupling with the driven portion on said sub-frame connectable in driving relationship to another driving motor and so that the vehicle may still be driven by said first driving means after this detachment of said sub-frame has occurred, said driving and driven portions respectively including bolted disconnectable driving and driven flanged coupling portions, said power take-off including a driving sheave, a universal joint secured to and located between said driven portion and driving sheave and rotatably secured to said sub-frame, a driven sheave rotatably secured to said sub-frame drivingly connected to said load unit, and a belt drivingly connecting said sheaves.

4. A vehicle, including a frame, a motor on said frame, rolling support means on said frame for supporting and propelling said frame along a direction of travel, a power take-off on said frame adapted to drive a load unit on said frame, a power divider on said frame driven by said motor, a first driving means drivingly connecting at least some of said rolling support means to said power divider for propelling said vehicle by said motor driving said some rolling support means through said power divider, a second driving means drivingly connecting said power take-off to said power divider for driving said power take-off by said motor through said power divider, said power take-off including a driving portion driven by said power divider and driven portion joined by a disconnectable coupling, said driving portion being driven by said power divider and supported by said frame, a sub-frame detachably secured to said frame, said load unit being secured to said sub-frame, said driven portion being connected in driving relationship to said load unit and being rotatably secured to said sub-frame so that said driven portion of said power take-off and load unit may be detached with said sub-frame from said frame at said coupling with the driven portion on said sub-frame connectable in driving relationship to another driving motor and so that the vehicle may still be driven by said first driving means after this detachment of said sub-frame has occurred, means drivingly connecting said motor to other of said rolling support means, and means preventing driving said some rolling support means and said power take-off simultaneously with said other rolling support means.

References Cited in the file of this patent

UNITED STATES PATENTS

| | | |
|---|---|---|
| 1,219,529 | Batenburg | Mar. 20, 1917 |
| 1,294,198 | Timberlake | Feb. 11, 1919 |
| 1,772,247 | Forrester et al. | Aug. 5, 1930 |
| 2,106,087 | Davey | Jan. 18, 1938 |
| 2,251,013 | Donley et al. | July 29, 1941 |
| 2,316,130 | Bohmer et al. | Apr. 6, 1943 |
| 2,601,297 | Keese | June 24, 1952 |
| 2,765,041 | Norrie et al. | Oct. 2, 1956 |

FOREIGN PATENTS

| | | |
|---|---|---|
| 496,121 | France | July 23, 1919 |
| 787,462 | Great Britain | Dec. 11, 1957 |
| 501,498 | Great Britain | Feb. 28, 1938 |